United States Patent

[11] 3,618,570

| [72] | Inventor | Procopio M. Chavez<br>102 Camino Dos S.W., Albuquerque, N. Mex. 87105 |
|---|---|---|
| [21] | Appl. No. | 882,191 |
| [22] | Filed | Dec. 4, 1969 |
| [45] | Patented | Nov. 9, 1971 |

[54] AUTOMATIC ANIMAL WATERING DEVICE
11 Claims, 6 Drawing Figs.

[52] U.S. Cl. ........................................................ 119/75
[51] Int. Cl. ..................................................... A01k 07/00
[50] Field of Search ........................................ 119/75, 54

[56] References Cited
UNITED STATES PATENTS

| 353,289 | 11/1886 | Cross............................. | 119/75 |
| 603,321 | 5/1896 | Dey............................... | 119/75 |
| 933,635 | 9/1909 | Durr.............................. | 119/75 |
| 1,701,338 | 2/1929 | Rowles........................... | 119/54 |
| 2,593,938 | 4/1952 | Tixhon et al..................... | 119/75 X |
| 3,043,267 | 7/1962 | Blough........................... | 119/75 |

Primary Examiner—Hugh R. Chamblee
Attorneys—Clarence A. O'Brien and Harvey B. Jacobson ABSTRACT: A water container for livestock defining an upwardly and forwardly opening and inclined throat. A water inlet is provided for the container and a normally closed inlet valve is provided for the inlet. Further, the inlet valve includes an actuator while the upper portion of the container includes a pressure plate guidingly supported from the container for horizontal shifting forward toward and rearward away from the forward upper marginal edge of the throat. Means is provided yieldingly urging the pressure plate toward a forward-most limit position spaced rearwardly from the forward edge of the throat and motion transmitting means is operatively connected between the pressure plate and the actuator for opening the valve in response to rearward movement of the pressure pad from its forward limit position as a livestock animal inserts his snout or nose down into the forwardly and upwardly inclined throat of the container.

PATENTED NOV 9 1971 3,618,570
SHEET 1 OF 2
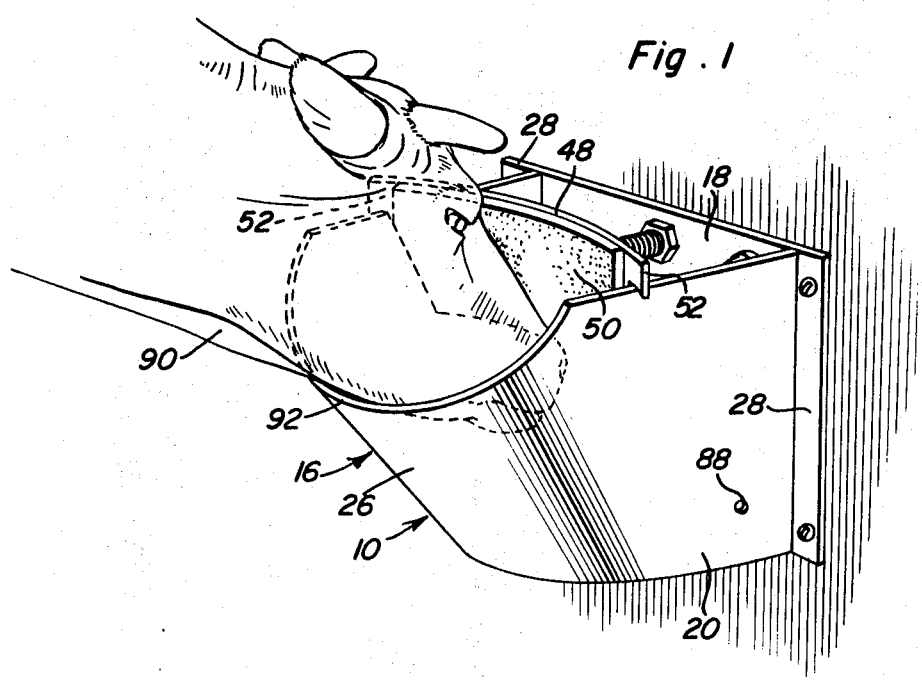
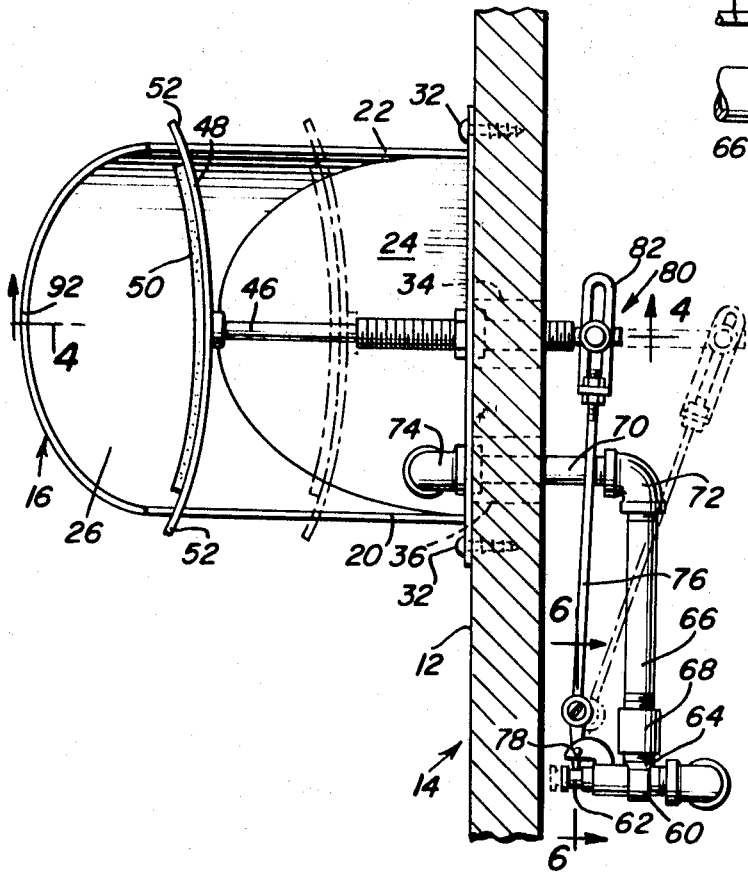
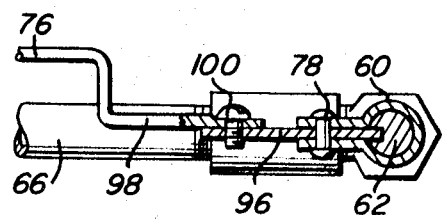
Procopio M. Chavez
INVENTOR.
BY *Clarence A. O'Brien*
*and Harvey B. Jacobson*
Attorneys

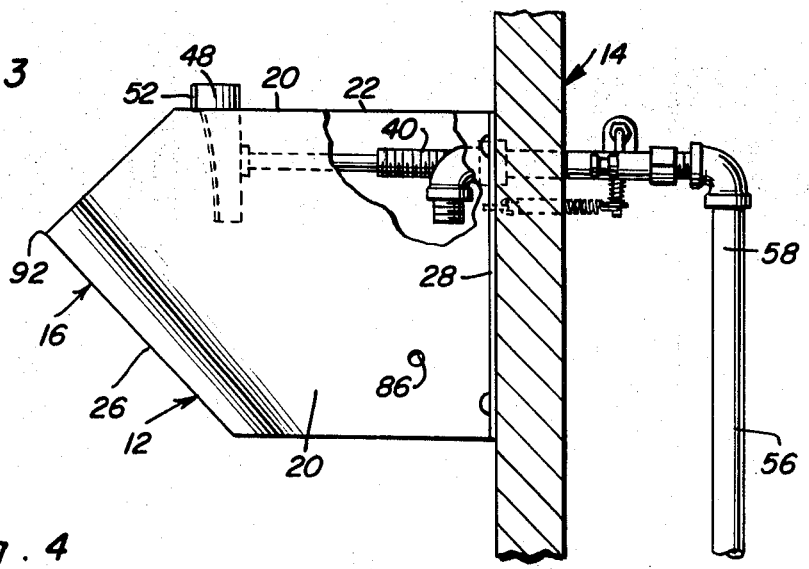
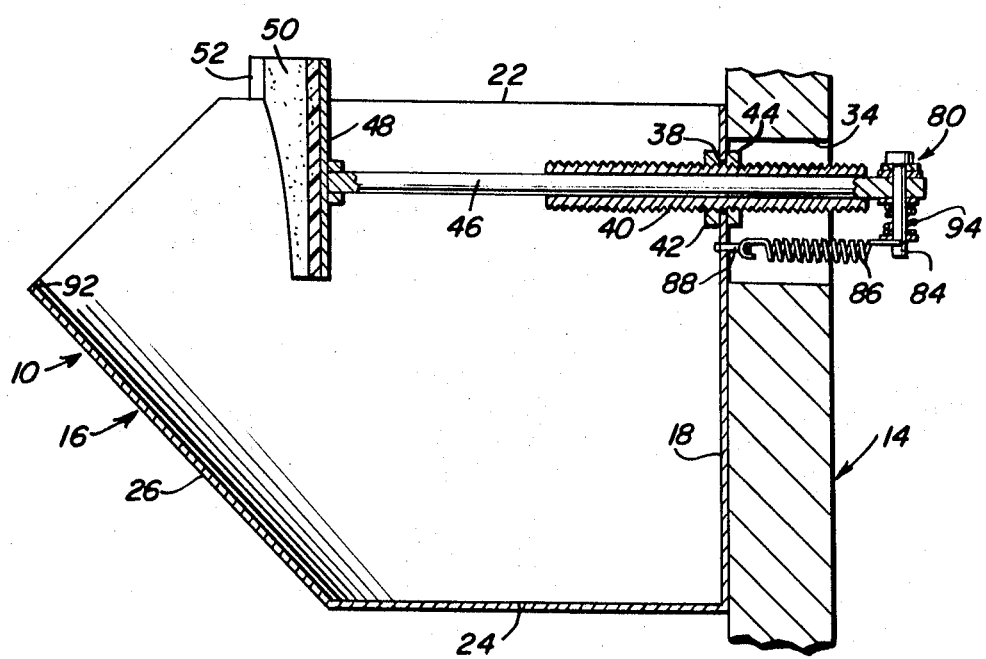
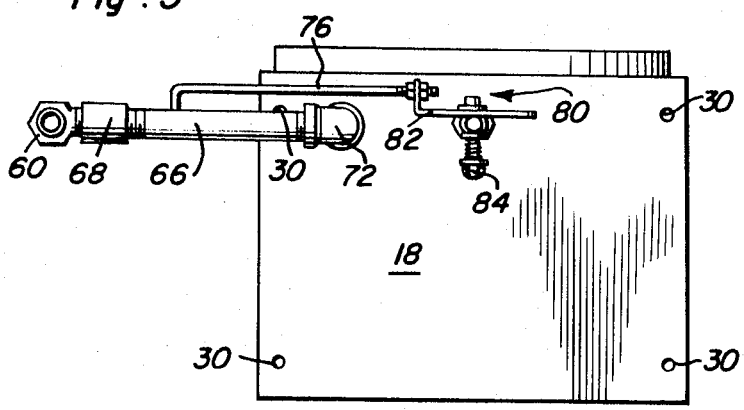

AUTOMATIC ANIMAL WATERING DEVICE

The watering device of the instant invention has been designed to provide means by which various animals, either domesticated or wild, may be provided with ample water whenever water is desired. The watering device is constructed in a manner whereby its operation will be uneffected by freezing temperatures (as long as the valve portion of the device is protected from freezing temperatures) and animals desiring water will be tempted to move its head in a manner causing fresh water to be discharged into the upwardly opening container portion of the water from which the animals may drink the desired water.

The main object of this invention is to provide a self-sustaining trouble-free waterer for animals whose construction enables the waterer to function as designed in the manner of a fountain-type waterer in below freezing weather as well as warmer weather.

Another object of this invention is to provide a waterer in accordance with the immediately preceding object particularly designed for use by horses and cattle, but which can be readily modified for use by smaller animals such as hogs, sheep, dogs, etc.

Still another object of this invention is to provide a waterer whose construction adapts the waterer for use by wild animals as well as domesticated animals.

Another object of this invention is to provide a waterer constructed in a manner whereby it may be readily installed in substantially any location wherein a source of water under pressure is available.

A further object of this invention is to provide a waterer whose mounting and water supply receiving components are constructed in a manner whereby the waterer may be readily shifted between various locations including sources of water pressure.

A final object of this invention to be specifically enumerated herein is to provide an automatic animal watering device in accordance with the preceding objects which will conform to conventional forms of manufacture, be of simple construction and automatic in operation so as to provide a device that will be economically feasible, long lasting and trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the waterer of the instant invention;

FIG. 2 is a top plan view of the waterer illustrated in FIG. 1 and with the wall structure from which the waterer is supported being illustrated in horizontal section;

FIG. 3 is a side elevational view of the waterer as seen from the right side of FIG. 1 and with the wall portion upon which the waterer is mounted illustrated in vertical sections;

FIG. 4 is an enlarged vertical sectional view taken substantially upon a plane indicated by section line 4—4 of FIG. 2;

FIG. 5 is a rear elevational view of the waterer; and

FIG. 6 is an enlarged fragmentary vertical sectional view taken substantially upon the plane indicated by the section line 6—6 of FIG. 2.

Referring now more specifically to the drawings the numeral 10 generally designates the waterer of the instant invention which is illustrated in FIGS. 1—4 of the drawings as being supported from a first wall 12 of a building structure referred to in general by the reference numeral 14.

The waterer 10 includes a water receptacle referred to in general by the reference numeral 16 and it may be seen from FIGS. 1 through 4 of the drawings that the receptacle 16 includes a rear wall 18, opposite sidewalls 20 and 22, a bottom wall 24 and a semicylindrical forwardly and upwardly inclined front wall 26. The lower edge portions of the walls 20, 22, and 26 are interconnected by the bottom wall 24 and the rear marginal edge portions of the walls 20, 22, and 24 are interconnected by the wall 18.

The rear wall 18 includes opposite side extensions 28 having vertically spaced apertures 30 (see FIG. 5) formed therein and the extensions 28 define mounting flanges by which fasteners 32 secured through the apertures 30 are utilized to secure the rear wall and thus the receptacle 16 to the wall or wall structure 12.

In order to adapt the wall 12 for receiving the waterer 10 thereon, the wall 10 is provided with a first relatively large diameter opening 34 formed therethrough as well as a second smaller diameter opening 36 formed therethrough. The rear wall 18 has a first opening 38 formed therethrough and an externally threaded sleeve 40 is secured through the opening 38 by means of a pair of jam nuts 42 and 44. An elongated actuator rod 46 is slidingly received through the sleeve 40 and has a semicylindrical plate 48 secured to its forward end. The axis of curvature of the plate 48 is substantially vertically disposed and the lower opposite side marginal edge portions of the plate 48 are bevelled downwardly and inwardly. Further, a resilient pad is secured to the front surface of the plate 48 in any convenient manner and the upper portions of the opposite sides of the plate 48 include horizontal extensions 52 which overlie and are slidingly engaged with the upper marginal edge portions of the sidewalls 20 and 22 of the receptacle 16. Accordingly, the extensions 52 support the plate and thus the forward end of the rod 46 from the upper marginal edge portions of the sidewalls 20 and 22.

The building structure 14 includes an interior wall supply pipe 56 including an outlet end 58. The pipe 56 defines a source of water under pressure and a control valve 60 including a reciprocal actuator 62 and an outlet neck 64 is secured to the outlet end 58 of the pipe 56. A first section 66 of a delivery line is connected to the outlet line 64 by means of a connecting element 68 and the outlet end of the first section 66 has the inlet end of a second section 70 connected thereto by means of an elbow 72. The outlet end of the second section 70 projects through the opening 36 and has a downwardly directed elbow or outlet 74 secured thereon.

The control valve 60 includes an actuating lever 76 pivotally supported from the control valve 60 as at 78 and operative to shift the actuator 76 from the solid line position thereof illustrated in FIG. 2 of the drawings to the dotted line position thereof when the actuating lever 76 is shifted from the solid line position of FIG. 2 to the phantom line position of FIG. 2. Of course, the actuator 62 is of the spring-loaded type and is normally biased toward the closed solid line position illustrated in FIG. 2.

The end of the lever 76 remote from the actuator 62 is connected to the rear end of the rod 46 by means of an adjustable pin and slot connection referred to in general by the reference numeral 80. The pin and slot connection 80 includes a longitudinally shiftable slotted element carried by the actuating lever 76 and a pin 84 carried by the rear end of the rod 46. An expansion spring 86 is connected between the lower end of the pin 84 and an anchor 88 supported from the rear wall 18. Thus, the spring 86 serves to yieldingly bias the plate 48 to a forwardmost limit position while the spring in the valve 80 serves to yieldingly bias the actuator 62 to the solid line position illustrated in FIG. 2.

The lower rear corner portion of the sidewall 20 of the receptacle 16 is provided with a small diameter weep opening 86 and a threaded plug defining member 88 is removably secured in the weep opening 86 for a purpose to be hereinafter more fully set forth.

In operation, and assuming that the waterer 10 has been mounted in the manner described above and that the ambient temperatures are expected to remain above freezing, the fastener or plug 88 is secured in the weep opening 86. Then, as an animal approaches the waterer 10, he is attracted to the water remaining in the bottom of the receptacle 16. In attempting to reach the water in the lower portion of the receptacle 16, the animal, such as the cow 90 in FIG. 1, inserts his nose down into the forwardly and upwardly opening portion of the receptacle 16 thus engaging his nose with the pad 50 which is preferably constructed of neoprene. Further downward insertion of the nose of the animal into the receptacle 16 will cause the plate 48 to be urged rearwardly against the biasing action of the spring 86 and the actuator 62 to be shifted from the solid line position thereof illustrated in FIG. 2 of the drawings to the phantom line position illustrated in FIG. 2. This of course will open the valve 60 and allow water to pass through the sections 66 and 70 of the delivery line and into the receptacle 16 through the elbow 94.

When the ambient temperatures are expected to remain above freezing, the position of the plate 48 may be adjusted through longitudinal adjustment of the sleeve 40 and adjustment of the slotted end 82 longitudinally of the actuating lever 76 so as to position the plate 48 closer to the front of the receptacle 16. This will in effect raise the level of the water within the receptacle 16 and any excess water delivered into the receptacle 16 while the animal 90 is drinking will flow out of the receptacle 16 over the forward upper lip 92 thereof. Thus, fresh water will be delivered into the receptacle 16 while the animal 90 is drinking so that reasonably fresh water will remain after the animal 90 has finished drinking to attract the next animal desiring to drink. Of course, as the water level in the receptacle 16 drops below the lip 92, the animal 90 pushes his nose further down into the receptacle 16 which will of course cause the plate 48 to be shifted rearwardly and the valve 60 to be opened.

When the ambient temperatures are expected to drop below freezing, the fastener or plug 68 is removed from the opening 86 and the positioning of the plate 48 when the valve is closed may be adjusted so as to have the plate 48 shifted more to the rear of the receptacle 16.

When the plug 88 is removed, any water remaining in the receptacle 16 after an animal has left will drain down to the weep opening 86 and outward through the latter. Then, if the outside temperature is below freezing and the water in the receptacle below the weep opening 86 freezes, the upper level of the ice is sufficiently low in the receptacle 16 so as to allow sufficient depth of water be discharged into the receptacle 16 above the ice to enable an animal to drink. In this manner, an animal wishing to drink from the receptacle 16 places his nose down into the receptacle as he is attracted to the ice. However, the animal must push his nose far enough down into the receptacle 16 so as to urge the plate 48 rearwardly thus resulting in fresh water from the delivery line to be discharged into the receptacle above the ice disposed at the level of the weep opening 86.

Of course, the discharging of fresh water into the receptacle at a temperature somewhat above freezing will cause any snow within the receptacle 16 and at least the upper portion of the ice disposed at the level of the weep opening 86 to melt whereby after the animal has finished drinking the weep opening 86 will be free of ice so as to again drain the water from within the receptacle 16 down to the level of the weep opening 86.

It is to be understood that the building structure 14 will be sufficiently warm to maintain the pipe 56, the valve 60 and the delivery line sections 66 and 70 from freezing during subfreezing weather.

The pin and slot connection 80 includes a compression spring 94 which assures smooth operation of the connection 80 and the actuating lever 86 includes a first short section 96 to which a second longer section 98 is secured in adjusted angulated position by means of fastener 100. In addition, the longer section 98 is offset so as to clear the second section 70 of the delivery line and it is to be noted that all of the components of the waterer 16 will be constructed of noncorrosive materials.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a water receptacle including front and rear portions, said receptacle defining a forwardly and upwardly opening throat downwardly into which the snout or nose and mouth portions of animals may be inserted, said receptacle including a water inlet, a valve operative to control the flow of water through said inlet, a pressure member guidingly supported for generally horizontal shifting forward toward and rearward away from the forward upper marginal edge of said throat means biasing said pressure member forwardly, motion transmitting means operatively connecting said pressure member to said valve for opening and closing the latter in response to rearward and forward shifting, respectively, of said pressure member, said motion transmitting means including a longitudinally reciprocal guidingly supported rod whose forward end is connected to said pressure member, said valve including a reciprocal valve actuator guidingly supported for reciprocation along a path generally paralleling the path of reciprocation of said rod, said motion-transmitting means further including an elongated lever pivotally supported intermediate its opposite ends for oscillation about an axis disposed transverse to said path, one end of said lever being operatively associated with said actuator for reciprocation of the latter in response to oscillation of said lever, and means defining a pin and slot connection between the other end of said lever and the rear end of said rod.

2. The combination of claim 1 wherein said pressure member is horizontally elongated and extends between opposite side areas of said receptacle.

3. The combination of claim 2 wherein said pressure member includes a forwardly facing concave surface.

4. The combination of claim 3 wherein said concave surface is defined by a resilient member carried by said pressure member.

5. The combination of claim 1 wherein said receptacle includes a bottom wall and upstanding sidewalls, one of said sidewalls including a small diameter weep opening therein spaced slightly above said bottom wall.

6. The combination of claim 5 including a readily removable closure for said weep opening.

7. The combination of claim 6 wherein the forward portion of said throat is defined by a forwardly and upwardly inclined and rearwardly opening semicylindrical front wall portion of said receptacle.

8. The combination of claim 7 wherein the forward upper edge portions of said throat lie generally in a rearwardly and upwardly inclined plane.

9. The combination of claim 8 wherein said pressure member is horizontally elongated and extends between opposite side areas of said receptacle.

10. The combination of claim 1 wherein the slot portion of said connection extends longitudinally of said lever.

11. The combination of claim 1 wherein said lever includes first and second end portion adjustably angularly displaceable relative to each other about an axis paralleling the first-mentioned axis.

* * * * *